US008855017B2

(12) United States Patent
Lemieux

(10) Patent No.: US 8,855,017 B2
(45) Date of Patent: Oct. 7, 2014

(54) SYSTEM AND METHOD OF BUILDING AN INFRASTRUCTURE FOR A VIRTUAL NETWORK

(75) Inventor: Yves Lemieux, Kirkland (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 189 days.

(21) Appl. No.: 13/163,246

(22) Filed: Sep. 7, 2011

(65) Prior Publication Data

US 2013/0058227 A1 Mar. 7, 2013

(51) Int. Cl.
| H04L 12/28 | (2006.01) |
| H04W 4/00 | (2009.01) |
| G06F 15/173 | (2006.01) |
| G06F 9/50 | (2006.01) |
| H04W 28/16 | (2009.01) |

(52) U.S. Cl.
CPC ............ *G06F 9/5077* (2013.01); *H04W 28/16* (2013.01)
USPC ............ 370/255; 370/328; 370/338; 709/226

(58) Field of Classification Search
USPC ................... 370/254, 255, 310–350; 709/226
See application file for complete search history.

(56) References Cited

U.S. PATENT DOCUMENTS

| 2004/0162058 A1* | 8/2004 | Mottes ........................ 455/411 |
| 2004/0260760 A1* | 12/2004 | Curnyn ........................ 709/201 |
| 2009/0119748 A1* | 5/2009 | Yao et al. ......................... 726/2 |
| 2009/0175198 A1* | 7/2009 | Arthursson .................. 370/254 |
| 2009/0181641 A1* | 7/2009 | Fiatal .......................... 455/406 |
| 2011/0213884 A1* | 9/2011 | Ferris et al. ................... 709/226 |
| 2012/0147824 A1* | 6/2012 | Van der Merwe et al. .... 370/329 |
| 2012/0310996 A1* | 12/2012 | Kulack et al. ................. 707/810 |

FOREIGN PATENT DOCUMENTS

WO 2006/045847 A1 5/2006

OTHER PUBLICATIONS

Arati Baliga et al., VPMN_Virtual Private Mobile Network Towards Mobility-as-a-Service, MCS'11, Jun. 28, 2011, Bethesda, Maryland, USA, pp. 7-11.
Vincenzo D. Cunsolo et al., Volunteer Computing and Desktop Cloud: the Cloud@Home Paradigm, 2009 Eighth IEEE International Symposium on Network Computing and Applications, pp. 134-139.
International Search Report from corresponding application PCT/IB2012/054586.
Wang, Y., et al., "VROOM: Virtual ROuters on the Move." Proceedings of the ACM SIGCOMM Workshop on Hot Topics in Networking, Atlanta, GA, Nov. 2007. ACM SIGCOMM, New York, NY.
Ripeanu, M., et al., "Globus and PlanetLab Resource Management Solutions Compared." Proceedings of the 13th IEEE International Symposium on High-Performance Distributed Computing (HPDC-13), Honolulu, HI, Jun. 2004. IEEE, Piscataway, NJ.

(Continued)

*Primary Examiner* — Warner Wong
(74) *Attorney, Agent, or Firm* — Coats & Bennett, PLLC

(57) ABSTRACT

A network resource module communicatively interfaces a resource manager with one or more network nodes in a communications network. Each network node provides one or more network resources that may be used to create a virtual infrastructure for a virtual network. The network resource module detects the network nodes, abstracts the resources associated with the network nodes at a desired granularity (e.g., node level or flow level) into Virtual Resource Objects (VROs), and then publishes the VROs in a registry. Thereafter, Virtual Network Operators (VROs) select desired VROs from the registry to build the virtual infrastructure for the virtual network.

10 Claims, 11 Drawing Sheets

(56) References Cited

OTHER PUBLICATIONS

Nurmi, D., et al., "A Technical Report on an Elastic Utility Computing Archietcture [sic] Linking Your Programs to Useful Systems." UCSB Computer Science Technical Report No. 2008-10. Date of publication: Oct. 1, 2008. UCSB, Santa Barbara, CA.

Khan, A., et al., "The Reconfigurable Mobile Network." 2011 IEEE International Conference on Communications Workshops (ICC). Jun. 5, 2011. IEEE, Piscataway, NJ.

* cited by examiner

```
<xmi:XMI xmi:version="2.1" xmlns:uml = http://schema.omg.org/spec/UML/2.0 xmlns:xmi=
"http://schema.omg.org/spec/XMI/2.1">
```

Root Class:
```
    <ownedMember isAbstract="false" isActive="false" isLeaf="false" name="Device"
    visibility="public" xmi:id="rz2XvtSGAqACBCw2" xmi:type="uml:Class">

<ownedMember isAbstract="false" isActive="false" isLeaf="false" name="Interface"
    visibility="public" xmi:id="TfOXvtSGAqACBCyX" xmi:type="uml:Class">
        ⋮
```

Device Class:
```
    <ownedComment body="3GPP Nodes role : Reg_UE, eNodeB, Serving_GW, PDN_GW,
    PCRF, HSS, SASN role : PEF, Switch, Router, DPI" name="" xmi:id="2q9vvtSGAqACBDKv"
    xmi:type="uml:Comment">

<ownedMember isAbstract="false" isActive="false" isLeaf="false" name="Serving_GW"
    visibility="public" xmi:id="AhgfvtSGAqACBDQd" xmi:type="uml:Class">
        ⋮
```

Configuration Class:
```
    <ownedComment body="configuration @ip" name="" xmi:id="F_ofvtSGAqACBDTC"
    xmi:type="uml:Comment">

<ownedMember isAbstract="false" isActive="false" isLeaf="false" name=
    "Policy_Action_Traffic_Class" visibility="public" xmi:id="jvNfvtSGAqACBDbW"
    xmi:type="uml:Class">
        ⋮
```

Interface Class:
```
    <ownedComment body="Interface_Type:VIF, PIF VIF: Virtual Interface PIF:Physical
    Interface" name="" xmi:id="FZkdgdSGAqACBJ8C" xmi:type="uml:Comment">

<ownedMember isAbstract="false" isActive="false" isLeaf="false" name="Link"
    visibility="public" xmi:id="gSooQdSGAqACBJWE" xmi:type="uml:Class">
        ⋮
```

Traffic Class:
```
    <ownedComment body="Type VM: Streaming Server Web Server" name=""
    xmi:id="bo_MQdSGAqACBLuv" xmi:type="uml:Comment">

<ownedMember isAbstract="false" isActive="false" isLeaf="false" name="Component"
    visibility="public" xmi:id="gp_BQdSGAqACBLRQ" xmi:type="uml:Class">
        ⋮
```

*FIG. 8*

SYSTEM AND METHOD OF BUILDING AN INFRASTRUCTURE FOR A VIRTUAL NETWORK

FIELD OF THE INVENTION

The present invention relates generally to communication networks, and specifically to adapting Infrastructure-as-a-Service (IaaS) management middleware to communicate with the network nodes of a communications network.

BACKGROUND

"The Cloud" generally refers to the on-demand computational resources that are available to a user via a computing network such as the Internet. Cloud computing increases the capacity and computational abilities for a user while relieving them of the responsibilities and costs associated with the installation and maintenance of the resources. These benefits stem from the fact that the resources comprising "the Cloud" (e.g., hardware, software, and infrastructure) are web-based and not resident on the user's computing device.

A "Telco-Cloud" is similar to the Cloud, only it refers to the resources in a communications network, such as a 3GPP Long Term Evolution (LTE) Evolved Packet Core (EPC) network architecture, and has its own set of unique requirements. For example, a TelcoCloud must have a 99.999% availability rate. With a Telco-Cloud, providers own and maintain the resources in the network. However, other providers that do not own the resources may still offer services that use those resources. Virtual Network Operators (VNOs), for example, can purchase or rent the use of some or all of the resources from the providers that own the resources, and offer their customers services that utilize those resources. This arrangement allows the VNOs to provide their services without having the costs and issues associated with owning the physical network.

There are three main service areas of interest for VNOs. These are Software-as-a-Service (SaaS), Platform-as-a-Service (PaaS), and Infrastructure-as-a-Service (IaaS). Briefly, SaaS, which is often referred to as "on-demand software," is a software delivery model. With SaaS, software and its associated data are centrally hosted on one or more network nodes in the Telco-Cloud. Users can access the software using, for example, a browser application. The PaaS is the delivery of the resources associated with a computing platform. Typically, PaaS resources include, but are not limited to, facilities for application design, application development, application testing, security, database integration, storage, and the like. Generally, PaaS-related resources are provisioned as an integrated solution and offered to customers. The final service area is the IaaS. With IaaS, the owning provider "outsources" the network nodes and resources of its communication network. The owning provider maintains the responsibility for running, managing, and maintaining the network nodes and resources, while the customers that use them (e.g., the VNOs) pay the owners on a predetermined basis.

With a special emphasis on the IaaS, it is often difficult for VNOs to create their respective networks using the network resources. For example, consider the network architecture for a 3GPP LTE-EPC communications network. In such networks, Policy and Charging Control (PCC) nodes are required to manage the Quality of Service (QoS) for the entire system. It is often desirable to provide network resources at varying levels of granularity. For example, it might be helpful to provide bandwidth resources at both a link level and a flow level, and allow the VNOs to select the resources that are right for their respective networks. However, the ability to provide this to the VNOs is hampered. Particularly, the PCC entities in the 3GPP LTE-EPC network are not able to communicate with some of the components outside of the network, which makes it difficult to identify available resources to a VNO.

SUMMARY

The present invention provides a system and method for allowing one or more virtual network operators (VNOs) to build and maintain a virtual network independently of each other. However, each virtual network that is created shares the same network resources of a physical communications network. The present invention is particularly useful for extending present day Infrastructure-as-a-Service functions to LTE-EPC communication networks.

In one embodiment, a network resource module is disposed between the network nodes of an LTE-EPC network and an IaaS middleware manager, such as a resource manager, for example. The network resource module comprises a communication interface that facilitates the communication of messages and signals between the resource manager and one or more network nodes in the LTE-EPC network. The network resource module also comprises a controller. In one embodiment of the present invention, the controller is configured to detect one or more network nodes present in the LTE-EPC network, and abstract the resources associated with those network nodes into corresponding Virtual Resource Objects (VROs). The VROs define the resources offered by the network nodes, and are published in a registry for discovery by a Virtual Network Operator (VNO) creating a virtual infrastructure for a virtual network.

In another embodiment, the present invention provides a client node for creating a virtual infrastructure for a virtual network using the VROs. In this embodiment, the client node comprises a communication interface that connects the client node to a registry identifying one or more Virtual Resource Objects (VROs). As stated previously, each VRO represents the resources associated with the network nodes and/or other network elements used to build and maintain the virtual infrastructure. The client node also comprises a programmable controller. In operation, the controller selects one or more desired VROs from the registry to include in a virtual container, and instantiates the VROs in the container to instantiate the virtual infrastructure for the virtual network.

The present invention provides a variety of advantages not realized by conventional systems. For example, the present invention extends the virtual LTC-EPC to existing data centers, and makes the PCC nodes in the network compatible with the Cloud Offering using IaaS middleware. Additionally, the present invention provides more granular control of the network resources for the creation and enforcement of policies, as well as Quality of Service (QoS) management. Further, the present invention enables new resources to be published and used by the VNOs much faster than in conventional systems.

Of course, those skilled in the art will appreciate that the present invention is not limited to the above contexts or examples, and will recognize additional features and advantages upon reading the following detailed description and upon viewing the accompanying drawings.

BRIEF DESCRIPTION OF THE DRAWINGS

FIG. 8 illustrates a list of available Virtual Resource Objects (VROs) as generic class definitions according to one embodiment of the present invention.

DETAILED DESCRIPTION

The present invention provides a system and method for extending the services offered by present-day Infrastructure-as-a-Service (IaaS) solutions to the Long Term Evolution-Evolved Packet Core (LTE-EPC) infrastructure. More particularly, the present invention abstracts the resources provided by one or more network nodes or other elements of an LTE-EPC network into Virtual Resource Objects (VROs). Different network operators are then able to utilize these VROs to build and maintain a virtual network. Thus, the present invention allows multiple network operators to create independent networks using the same network resources.

One embodiment of the present invention provides a Network Resource module that communicatively connects the IaaS management controller and the Policy, Charging, and Control (PCC) nodes within the LTE-EPC infrastructure. Such PCC nodes include, for example, a Home Subscriber Server (HSS), Service-Aware Support Node (SASN), a Packet Data Network-Gateway (PDN-GW), a Policy and Charges Rule Function (PCRF), and a Policy and Charging Enforcement Function (PCEF). The Network Resource module abstracts the resources provided by the PCC nodes into a context that is known to the IaaS management controller. The management controller then publishes these abstractions (i.e., the VROs) in a registry accessible to the network operators for use in building and maintaining their virtual communications networks.

Figure 1:
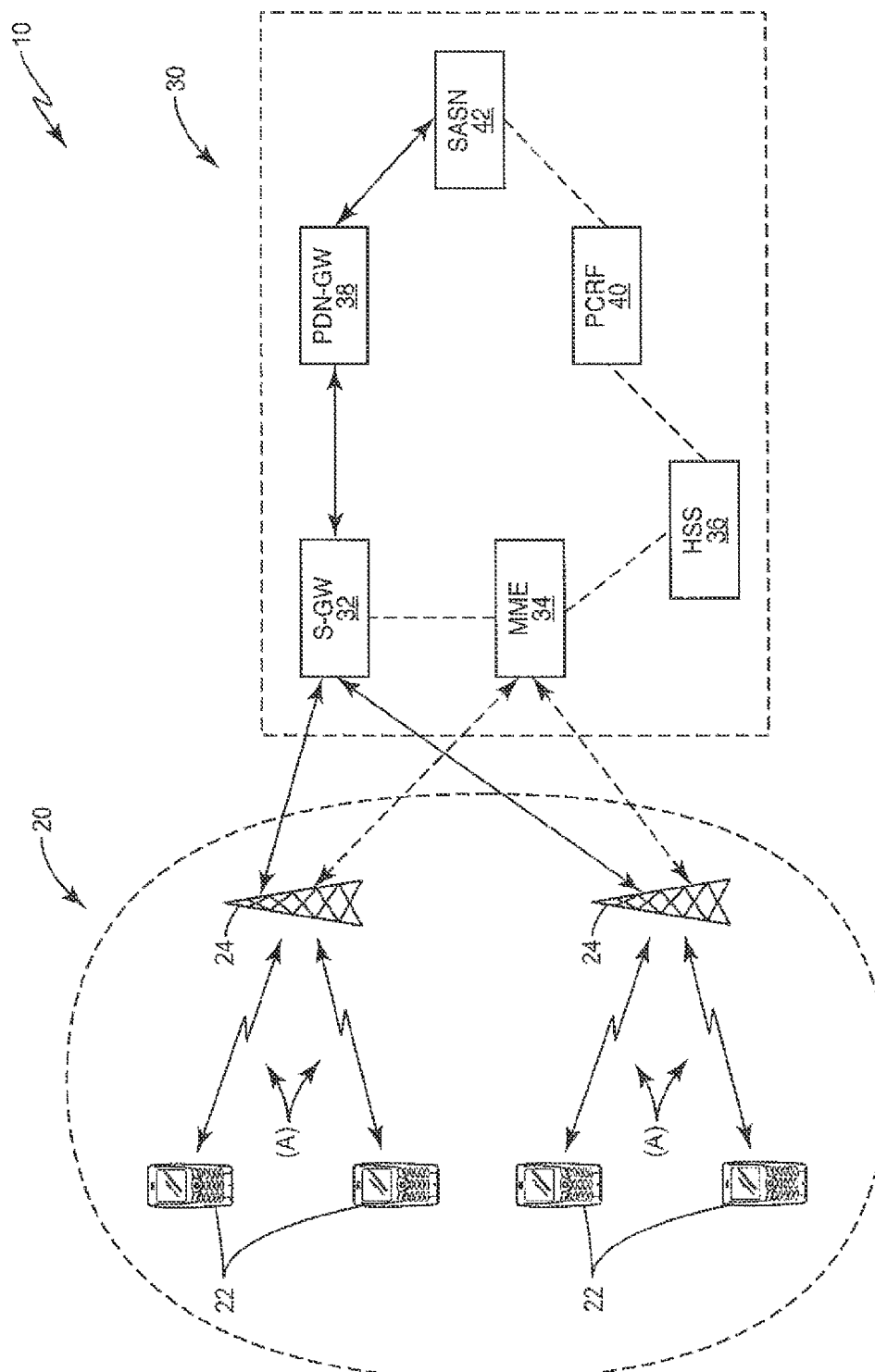
FIG. 1 is a block diagram illustrating the architecture of an exemplary LTE-EPC network and some of the network components according to one embodiment of the present invention.

Turning to the drawings, FIG. 1 illustrates an exemplary architecture for a Long Term Evolution—System Architecture Evolution (LTE-SAE) network 10 suitable for use in one embodiment of the present invention. These networks and their operations are well-known in the art, and thus, only a brief discussion of network 10 and its components is included herein for clarity. For more specific information regarding the architecture and functionality of network 10, the interested reader is referred to the 3GPP description document entitled, "Overview of 3GPP Release 10 V0.1.0 (2011 April)," dated April, 2011. This document, and its contents, is incorporated herein by reference in its entirety.

The LTE-SAE network 10 has a flat, IP-based architecture comprising an LTE-based Radio Access Network (RAN) 20 interconnected with an EPC network 30. As is known in the art, the components in the LTE-SAE network 10 communicate both user data and signaling along separate paths or links (i.e., the data plane and the control plane, respectively). In FIG. 1, solid lines are used to indicate the bi-directional user data paths in the data plane, while dashed lines are used to indicate bi-directional signaling paths in the control plane. Generally, one or more user terminals 22 (e.g., cellular telephones) utilize the RAN 20 to gain access to services and functions offered by the EPC 30, as well as by other networks (e.g., the Internet—not shown) connected to the EPC 30. The EPC 30 provides the core functionality for both circuit switched (CS) services and packet switched (PS) services.

The user terminals 22 communicate over an air interface (A) with one or more eNodeBs 24, which are access points into the EPC 30. As is known in the art, the eNodeBs 24 are disposed in a flat architecture and perform a variety of communication functions. These functions include, but are not limited to, modulation/de-modulation of the radio signals communicated with the user terminals 22, channel coding/de-coding, mobility management (e.g., measurement and handover processing), and some Radio Resource Control (RRC) functions (e.g, allocation, modification, and release of the resources facilitating transmission over the air interface (A)). The eNodeBs 24 also include the capability to transfer data to/from other devices or nodes in the LTE-SAE network 10.

The EPC 30 comprises a Service Gateway (S-GW) 32, a Mobility Management Entity (MME) 34, a Home Subscriber Server (HSS) 36, a Packet Data Network Gateway (PDN-GW) 38, a Policy and Charging Rules Function (PCRF) 40, and a Service Aware Support Node (SASN) 42.

The S-GW 32 is connected to the eNodeBs 24 via corresponding data paths, and provides communicatively connects the RAN 20 and the EPC 30. The S-GW 32 also maintains a data path with the PDN-GW 38. Functionally, the S-GW 32 provides an ingress/egress point between the RAN 20 and the EPC 30, and serves as a local mobility anchor for user terminals 22 move across the eNodeB 24 coverage areas.

The MME 34 is a control plane entity that performs the signaling and control functions used to manage access by the user terminals 22 to the EPC network 30. More specifically, the MME 34 controls the assignment of network resources, supports tracking, paging, roaming and handovers, and controls all control plane functions related to subscriber and session management. The MME 34 is also configured to perform various bearer management control functions to establish one or more bearer paths used by the user terminals 22 and eNodeBs 24 to communicate data and signaling traffic. In addition, the MME 34 is configured to support other functions such as security procedures (e.g., end-user authentication, session initiation, the negotiation of algorithms for ciphering and integrity protection) and terminal-to-network session handling (e.g., all signaling used to set up a packet data context and negotiate a desired Quality of Service (QoS)). As seen in FIG. 1, the MME 34 is communicatively connected to the eNodeBs 24, the S-GW 32, and the HSS 36 via corresponding signaling links.

The HSS 36 comprises a central database for storing information associated with the user terminals 22 and connects to the MME 334 and the PCRF 40 via signaling links. In this embodiment, the HSS 36 is configured to support functionalities such as mobility management, call and session establishment support, and user authentication and access authorization.

The PDN-GW 38 is similar to the S-GW 32 in that it serves as a termination/anchor point of the packet data interface towards one or more Packet Data Networks (PDNs). In its role as an anchor point, the PDN-GW 38 supports features and functions such as policy enforcement (e.g., operator-defined rules for resource allocation and usage), packet filtering (e.g., packet inspection), and charging support. In FIG. 1, the PDN-GW 38 communicates user data with the S-GW 32 and the SASN 42 in the data plane over corresponding data paths.

The PCRF 40 is a network node residing in the control plane that helps to optimize the interactions that occur between the various policy and rules functions. In one embodiment, the PCRF 40 is configured to support various policy decision functions. For example, the PCRF 40 can access subscriber databases and charging systems, support the creation of rules and policies on a per-user and/or per-group basis, control access to premium content, control access to features based on accumulated usage, and optimize network resource utilization by applying Quality of Service (QoS) control.

Finally, the SASN 42 is a tool residing in the data plane that allows network operators to inspect traffic flows in multi-vendor and multi-access networks. Together with the PDN-GW 38, the SASN 42 may support policy enforcement features. As seen in FIG. 1, the SASN 42 receives data packets from the PDN-GW 38 over a user data connection, and signaling data from the PCRF 40 over a signaling connection. Based on an inspection of the packets, the SASN 42 provides network operators, in real-time, with a greater control of the resource allocation. More specifically, when implemented together with the PCRF 40, the SASN 42 allows the network operators to manage and optimize the utilization of one or more network resources based on deep-packet inspection, and enables the identification of virtually any type of application.

As stated previously, the present invention abstracts the resources provided by one or more network nodes of an LTE-EPC network into Virtual Resource Objects (VROs). Different network operators, which are not necessarily the same operators that own or maintain the network nodes, are then able to build and maintain a virtual network using these VROs. This approach allows the costs of building and maintaining an LTE-EPC network to be shared across multiple operators.

Figure 2:
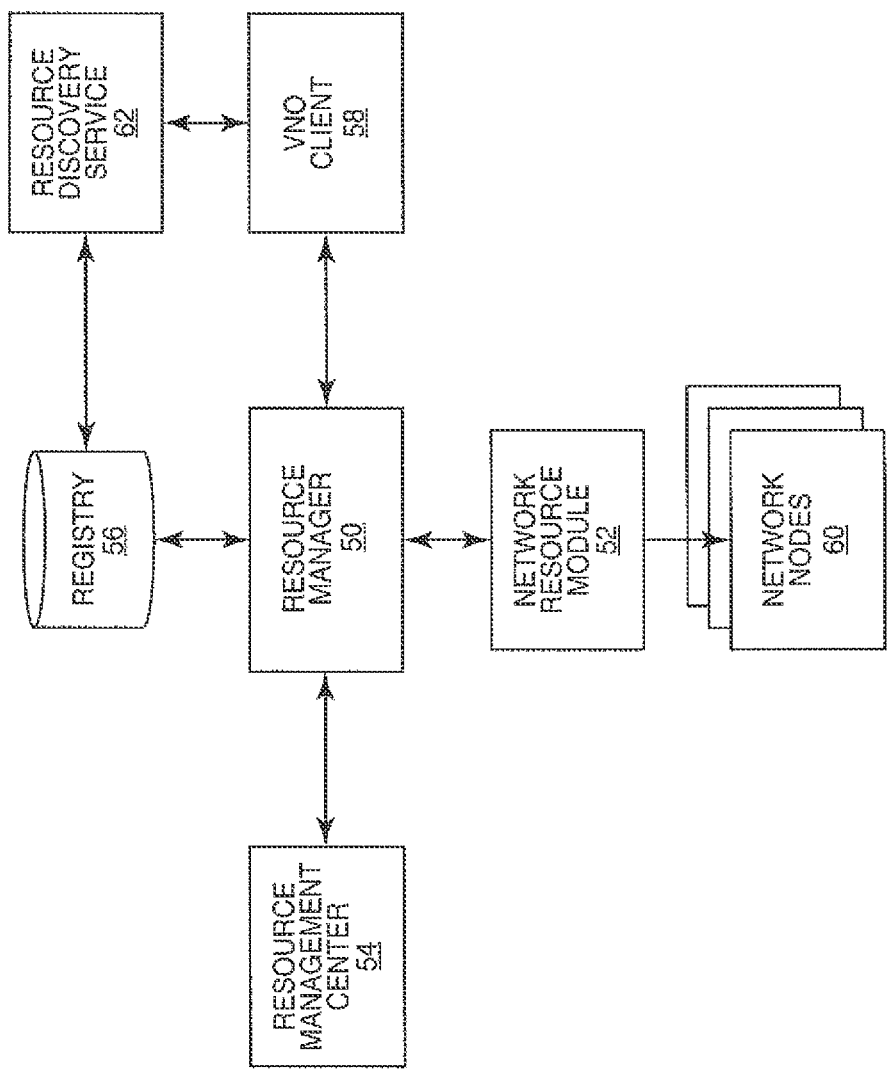
FIG. 2 is a block diagram illustrating some of the components that are used to detect and publish network resources, and build and maintain a virtual network using those resources according to one embodiment of the present invention.

FIG. 2 illustrates some of the components involved in abstracting the network resources, and in building a virtual network from the abstracted resources, according to one embodiment of the present invention. As seen in FIG. 2, the components comprise a resource manager 50 communicatively interconnecting a network resource module 52, a resource management center 54, a registry 56, and a Virtual Network Operator (VNO) client node 58.

The resource manager 50 is the IaaS management middleware, and is controlled by the owner(s) and operator(s) of the LTE-SAE network 10 via one or more computing devices at the resource management center 54. In operation, the resource manager 50 is responsible for receiving the abstractions describing the resources provided by the network nodes, and publishing those abstractions (i.e., the VROs) to a public registry, represented by registry 56. The resource manager 50 may publish the VROs in any known context; however, in one embodiment, which is seen in FIG. 8, the available VROs are described as generic class definitions in one or more files using eXtensible Markup Language (XML), and sent to the registry 56 using, for example, XML Metadata Interchange (XMI).

The resource manager 50 is not typically configured to communicate with the network nodes 60 (e.g., the S-GW 32, MME 34, HSS 36, PDN-GW 38, PCRF 40, and the SASN 42). Therefore, according to the present invention, the network resource module 52 is disposed between the resource manager 50 and the network nodes 60. As seen in FIG. 2, the network resource module 52 comprises an independent computing device, such as a server, for example. However, this is for clarity and illustrative purposes only. In another embodiment, the network resource manager 52 comprises a software module executing on another computing device, such as the resource manager 50. In other embodiments, the network resource module comprises a plug-in executing on one or more of the network nodes 60.

Regardless of positioning, the network resource module 52 functions as an intermediary between the IaaS middleware executing on the resource manager 50 and the network nodes 60. That is, the network resource module 52 is configured to detect or sense the different network nodes 60 in the LTE-SAE network 10, by exchanging messages with the controllers of these network nodes, for example, and then abstracting the resources provided by those network nodes 60 into a context that is understood by the resource manager 50 (i.e., the VROs). For example, as seen in FIG. 8, the network resource module 52 in one embodiment abstracts the network resources into one or more classes using XML. The network resource module 52 then sends the abstracted resource descriptions to the resource manager 50 for publishing as VROs in the registry 56.

It should be understood that detecting the network nodes 60 may be accomplished using any method known in the art. In one embodiment, for example, the network resource module 52 exchanges messages with the controllers of each of the network nodes 60. The messaging, which may be initiated by the particular network nodes 60 in the LTE-SAE network 10 or by the network resource module 52, carries information describing the resources they offer for consumption by the VNOs from the network nodes 60. Upon receipt, the network resource module 52 generates the VROs by abstracting the received information into one or more classes in an XML file, and sends the resultant XML file to the resource manager 50.

In another embodiment, the owner(s)/operator(s) of the LTE-SAE network 10 initially provisions the resource manager 50 with the resources provided by each network nodes 60 via the resource management center 54. Then, as each network node 60 is detected in the network 10, it exchanges messages with the network resource module 52. The network resource module 52, in turn, notifies the resource manager 50, which then generates the appropriate VROs from the provisioned information.

The registry 56, as stated above, is a public registry that receives the VROs from the resource manager 50 and stores them for consumption by one or more Virtual Network Operators (VNOs). More specifically, a given VNO client node 58 communicatively connects to the registry 56 via the resource manager 50. Using the client node 58, the VNO can select one or more desired VROs to use in building and maintaining a virtual network. For example, the VNO may wish to build a virtual network having a certain amount of bandwidth, or that provides subscribers with certain functionality. Using the client node 58, the VNO can browse the available VROs stored in the registry 56, and select those that match the specific VNO requirements.

In some embodiments, a resource discovery service 62 may be utilized by the VNO to automatically search for specific resources that would match the VNO requirements. Particularly, the VNO could identify specific requirements and/or needs for building a virtual network to the resource discovery service 62. The resource discovery service 62 would then periodically search the registry 56 and, upon finding one or more VROs sufficient to satisfy the stated requirements, notify the VNO who would then select the appropriate VROs from the registry 56.

Figure 3A:
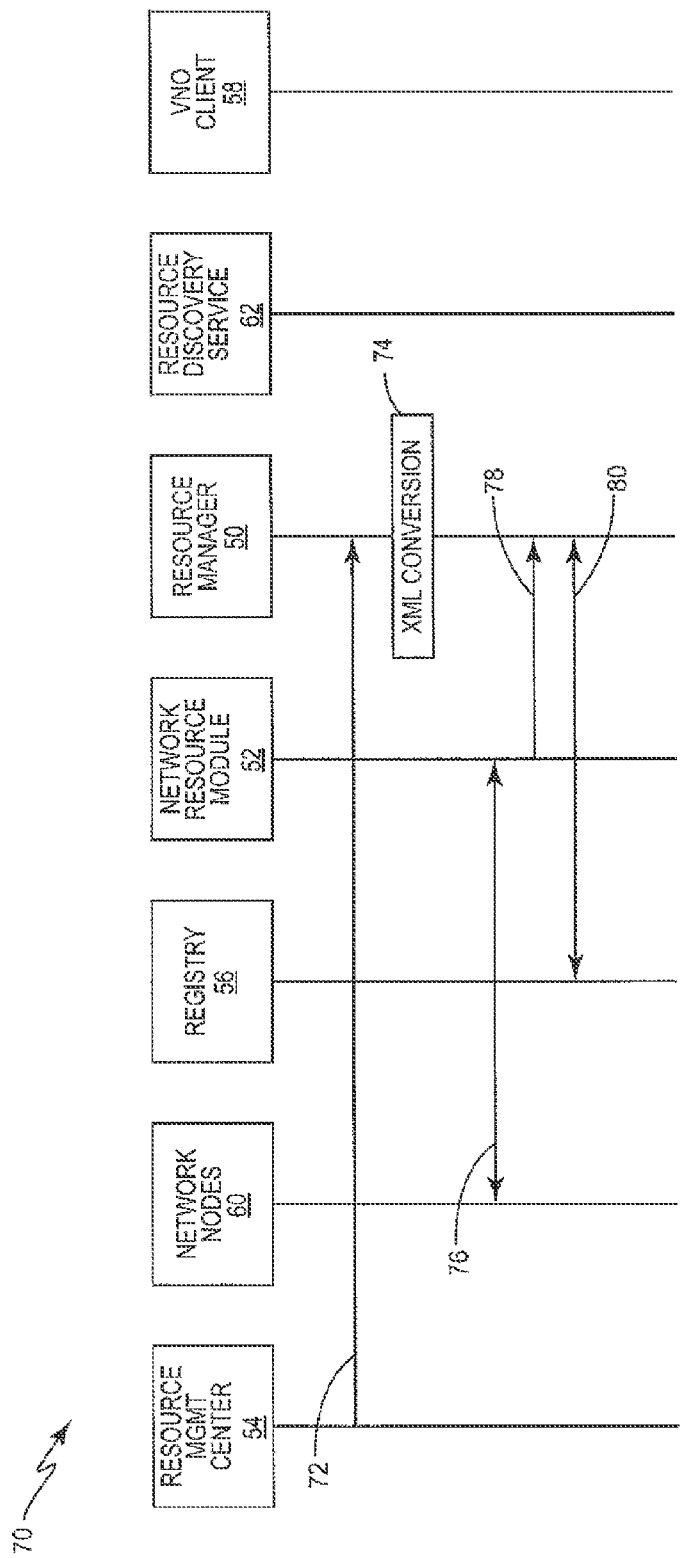
FIG. 3A is a signal diagram illustrating exemplary messaging for detecting and publishing available network resources according to one embodiment of the present invention.

FIG. 3A is a signaling diagram 70 illustrating the message exchanges that occur between the different components when detecting and publishing selected resources to the registry 56. In a first embodiment, the owner(s)/operator(s) of the LTE-SAE network 10 provision the resource manager 50 with information identifying and defining the resources that are provided by one or more of the PCC nodes in the LTE-SAE network 10 (line 72). As previously stated, the PCC entities may include, but are not limited to, the network nodes and other elements resident in the network 10 (e.g., the eNodeBs 22, S-GW 32, MME 34, HSS 36, PDN-GW 38, PCRF 40, and the SASN 42). Additionally, as described later in more detail, the owner(s)/operator(s) may also provision the resource manager 50 to define a "virtual container" having a set of default resources that is assigned to every new VNO creating a virtual network.

Once the resource manager 50 receives the information from the resource management center 54, the resource manager 50 executes a software program that converts the received information into one or more VROs in an XML-based file (box 74), and stores it in a memory. Then, when the network resource module 52 detects or senses the presence of a network node 60 (line 76), it sends a notification to the resource manager 50 (line 78). The resource manager 50 may then read the saved VROs from its memory, and publish those VROs to registry 56 for consumption by the VNOs (line 80). For example, the resource manager 50 may send the XML-based file containing the VROs to the registry 56 using the XML Metadata Interchange (XMI). Once published, VNOs can select desired VROs and use them to build their respective virtual networks as previously described.

Figure 3B:
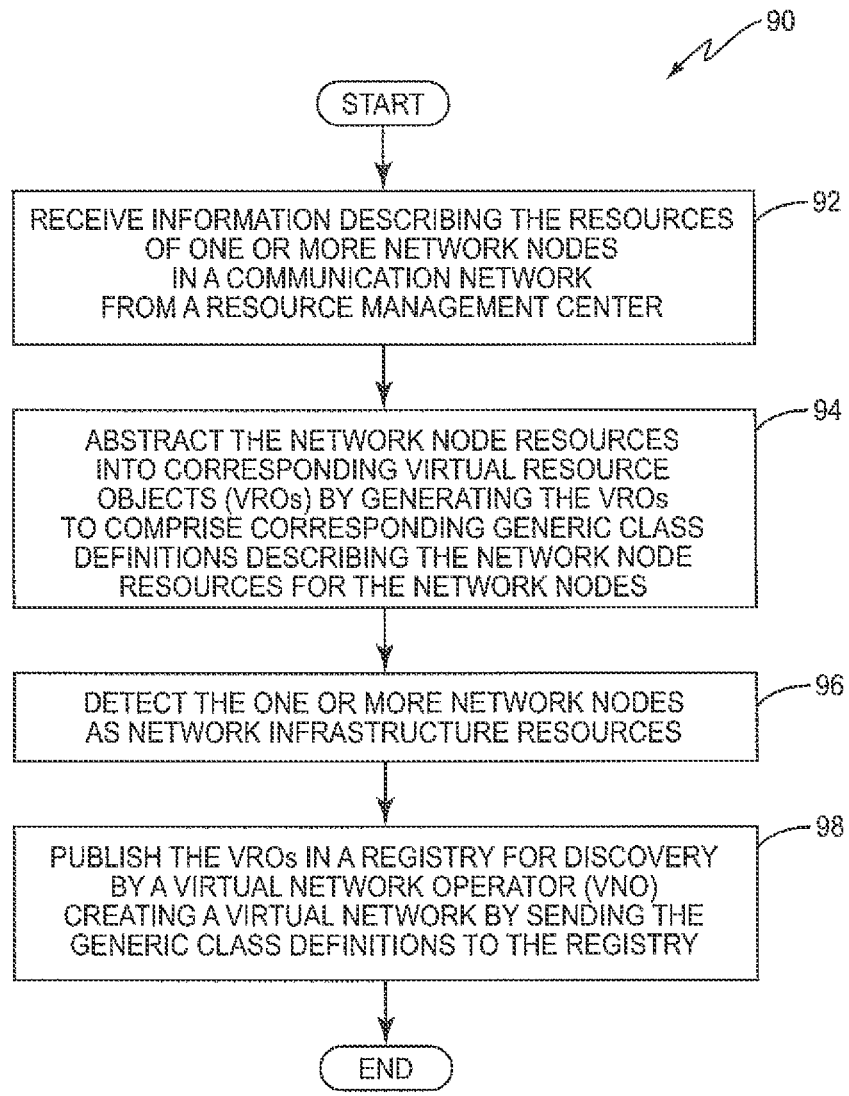
FIG. 3B is a flow diagram illustrating a method of detecting and publishing available network resources according to one embodiment of the present invention.

FIG. 3B is a flow diagram illustrating a method 90 for detecting and publishing the network node resources according to one embodiment of the present invention. Method 90 begins with the receiving of information describing the resources of one or more network nodes 60 from the resource management center 54 (box 92). Upon receipt, the method 90 abstracts the network node resources into corresponding VROs (box 94). For example, in one embodiment, the method generates the VROs by describing the network node resources in corresponding generic class definitions, such as those seen in FIG. 8, for example. Once provisioned, the method 90 detects one or more network nodes 60 as resources for a network infrastructure (box 96). The method then publishes the VROs in registry 56 for discovery by one or more VNOs building a virtual network by sending the generic class definitions to the registry (box 98).

Figure 4A:
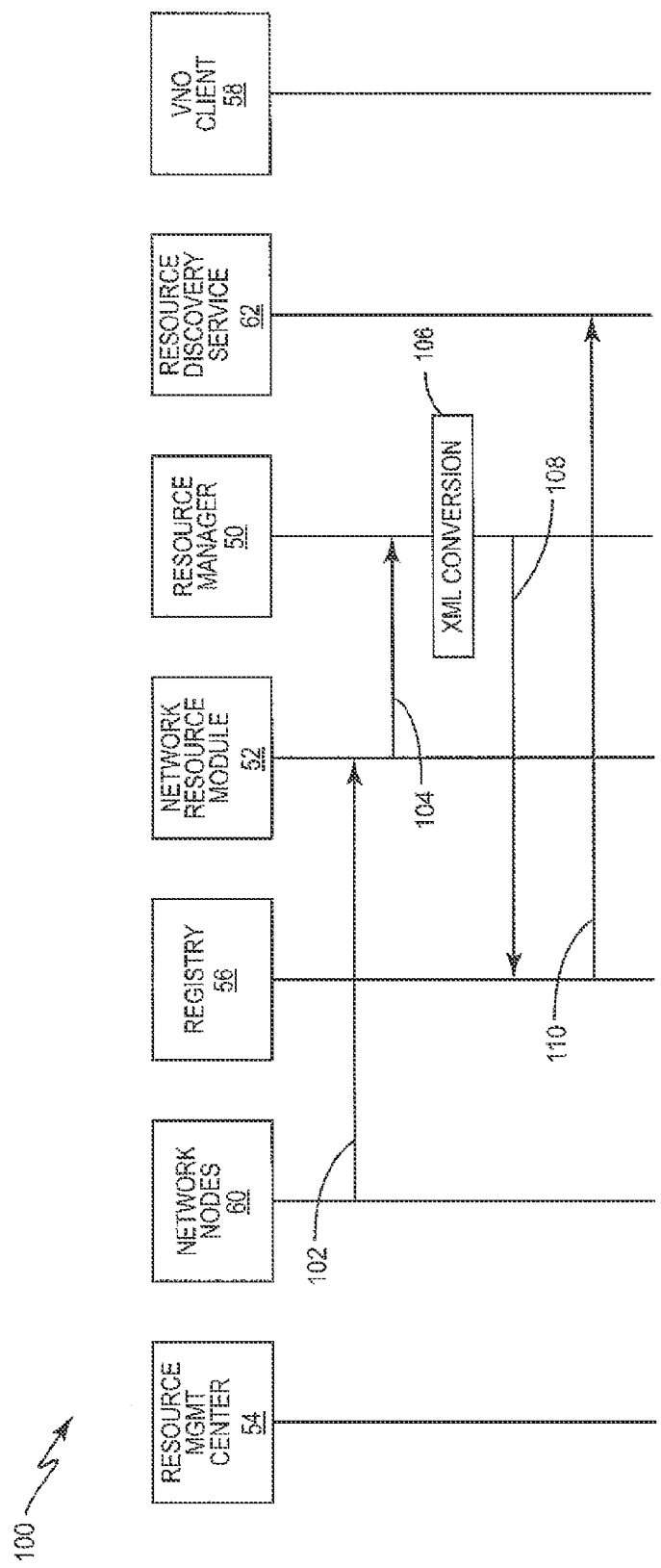
FIG. 4A is a signal diagram illustrating exemplary messaging for detecting and publishing available network resources according to another embodiment of the present invention.

FIG. 4A illustrates signaling diagram 100 for another embodiment in which the owner(s)/operator(s) do not provision the information. Rather, the network resource module 52 detects or senses the network nodes 60 when they are present in the LTE-SAE network 10 (box 102). Associated with the signal or message that allows the network resource module 52 to detect the network nodes 60 is information defining the resources provided by the network nodes 60. The network resource module 52 then sends the information to the resource manager 50 (line 104), which performs the XML conversion to generate the XML-based file containing the VROs (box 106). After conversion, the resource manager 50 transfers the VROs to the registry 56 (line 108) via XMI for discovery by the resource discovery service 62 (line 110).

Figure 4B:
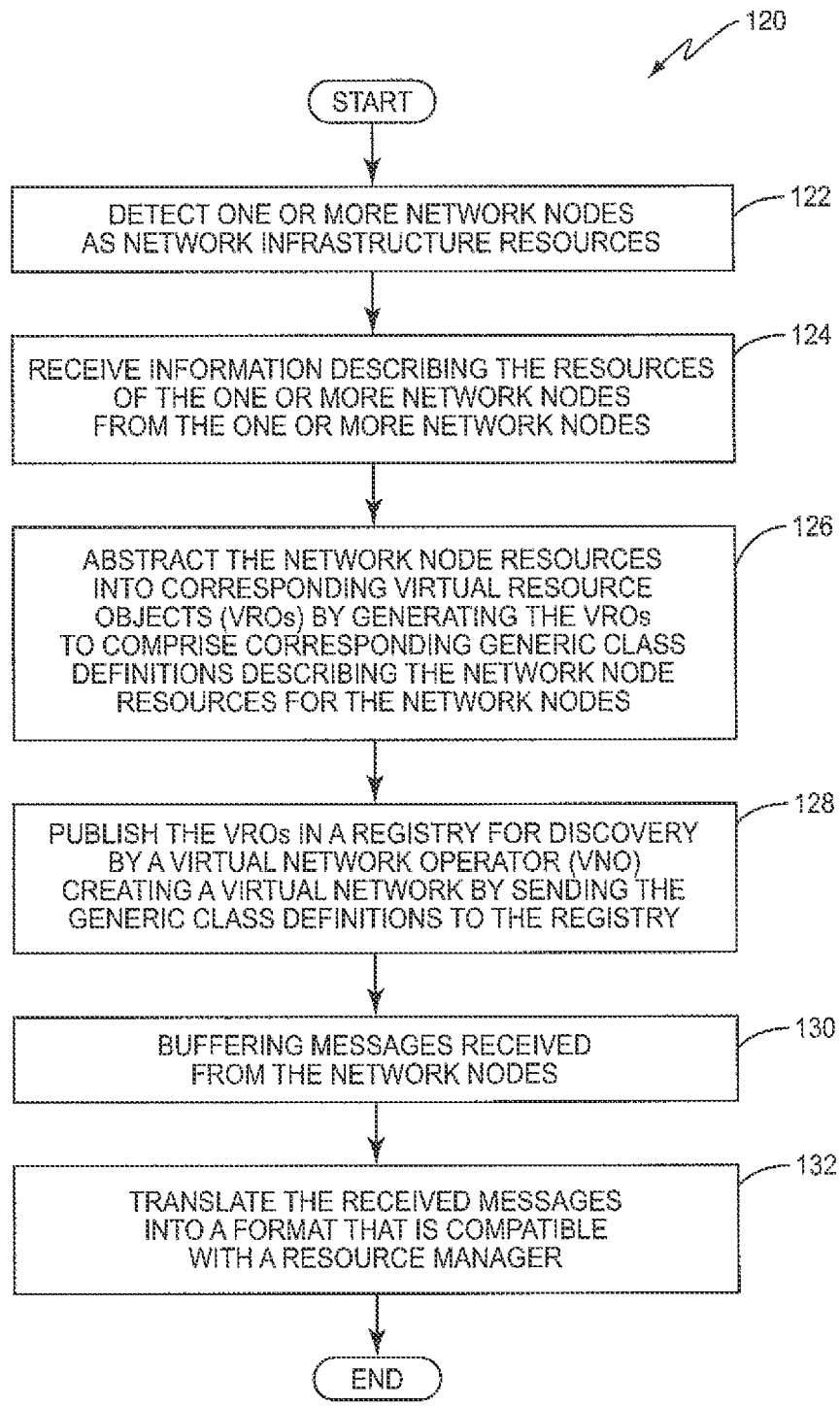
FIG. 4B is a flow diagram illustrating a method of detecting and publishing available network resources according to another embodiment of the present invention.

FIG. 4B is a flow diagram illustrating a method 120 for detecting and publishing the network node resources according to another embodiment of the present invention. Method 120 begins with the network resource module 52 detecting one or more network nodes as network infrastructure resources (box 122). The network resource module 52 then receives information describing the resources of the network nodes (box 124). This information may be received, for example, in one or more messages from the network nodes. The network resource module 52 abstracts the network node resources into corresponding VROs by generating, for example, generic class definitions (e.g., as seen in FIG. 8) describing the network node resources (box 126). Once generated, the network resource module 52 publishes the VROs in the registry 56 for discovery by one or more VNOs building respective virtual networks. For example, the network resource module may publish the VROs by sending an XML file containing the generic class definitions to the registry 56 (box 128). As stated previously, the IaaS middleware may not be able to communicate with the network nodes 60 (box 130). Therefore, the network resource module 52 buffers messages received from the network nodes 60 in its memory, and translates those messages from a first format used by the network nodes 60 and a second format used by the IaaS middleware (box 132).

Figure 5A:
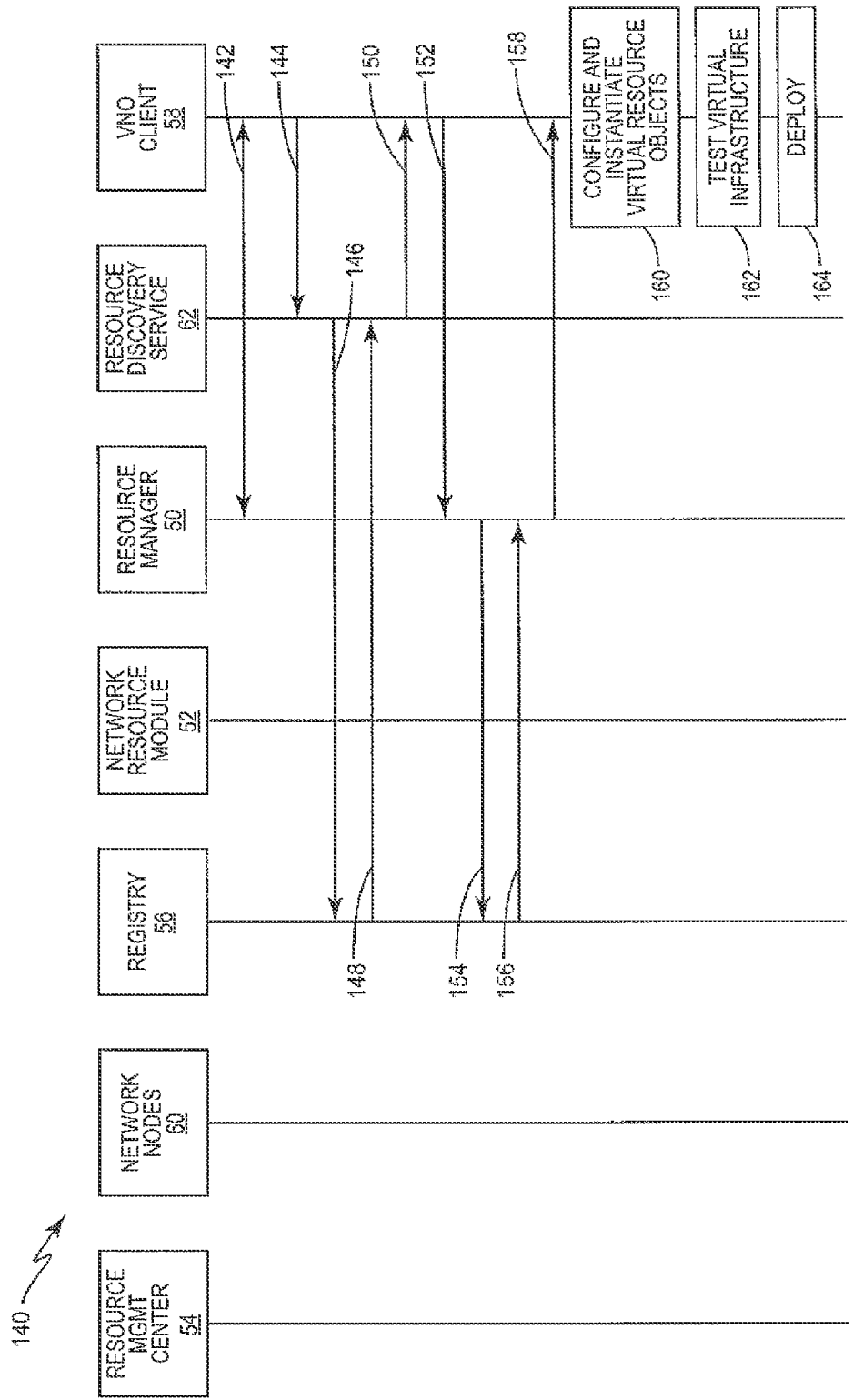
FIG. 5A is a signal diagram illustrating exemplary messaging for creating a virtual network according to one embodiment of the present invention.

FIG. 5A is a signaling diagram 140 illustrating the message exchanges that occur when a VNO creates a virtual network using the VROs stored in the registry 56. As seen in FIG. 5A, a VNO first contacts the resource manager 50 from the client node 58 to obtain Accounting, Authentication, and Authorization (AAA) permissions to build a virtual LTE-SAE network (line 142). During this exchange, the VNO may also be provided with a "virtual container" that includes a default set of resources needed to create the network. The default resources may comprise, for example, basic billing and charging resources provided by one or more of the PCC entities in the LTE-SAE network 10, and/or a basic set of rules and policy resources provided by the PCRF 40. Other resources provided by the other network nodes 60 within the network 10 may also be included in the default set of resources. These are generally set by the system administrator or the owner(s)/operator(s) of the LTE-SAE network 10 on which the IaaS is based.

Once the VNO has a virtual container, the VNO can use the client node 58 to add and delete resources to complete the virtual network. In this embodiment, the VNO has access to the resource discovery service 62, and identifies one or more desired resources to the service 62 (line 144). The discovery service 62 then queries the registry 56 to determine if the VNOs desired resources are available (line 146). The registry responds with an answer as to whether the VROs associated with the desired resources are available (line 148), which the discovery service 62 passes back to the client 58 (line 150). The answer may be, for example, an ACK/NACK, or it may be an indicator that identifies specific resources listed on a display of the client node 58 as being available/not available.

The VNO, via the client node 58, can then query the registry 56 to obtain the desired VROs. Particularly, the client node 58 queries the resource manager 50 with a message identifying the selected VROs (line 152). The resource manager then generates a request to retrieve those selected VROs and sends the request to the registry (line 154). If available, the registry 56 sends the selected VROs back to the resource manager 50 (line 156), which then returns the VROs to the client device 58 for inclusion in the VNOs virtual container (line 158).

Once the VNO has received the VROs for the desired resources, the VNO can utilize a Graphical User Interface (GUI) displayed at the client node 58 to configure and instantiate the selected VROs that will create the virtual network (box 160). By way of example, consider a VNO that has selected HSS 36, PCRF 40, SASN 42, and PDN-GW 38 resources. In one embodiment, the HSS 36 resources represent a User Profile Database. To configure and instantiate the HSS 36, the VNO may, for example, add one or more user terminals 22 to the HSS 36. While in operation, the VNO can also remove the one or more user terminals from the HSS 36.

The VNO may also provide static and dynamic rules and policies to the PCRF 40, in addition to any rules and policies that might be delivered with the default virtual container. Other functions the VNO may perform to instantiate and configure the selected VROs is to identify certain services that it will provide (e.g., traffic types web services, web services bindings to other applications, packet inspection services, and other 3GPP services, etc.) to the PDN-GW 38, and determine and create the different Quality of Service (QoS) profiles that the PDN-GW will have to support (e.g., bandwidth throttling, packet dropping, user profile classes, etc.).

Once configured, the VNO instantiates a test virtual network to test the "infrastructure" of the virtual network (box 162). Particularly, the VNO tests a plurality of user terminals 22 under congested conditions with the rules and policies that have been defined, and within any bandwidth constraints applied. This "virtual test network" can be used by the VNO to ensure that the virtual network will operate properly under defined conditions without interfering with the operation of another VNO's virtual network. Once the virtual network has been tested satisfactorily, the network is deployed for actual use by the VNO (line 164). Thereafter, the registry 56 will, from time-to-time, include new VROs that the VNO is free to use to alter and/or maintain the virtual network.

Figure 5B:
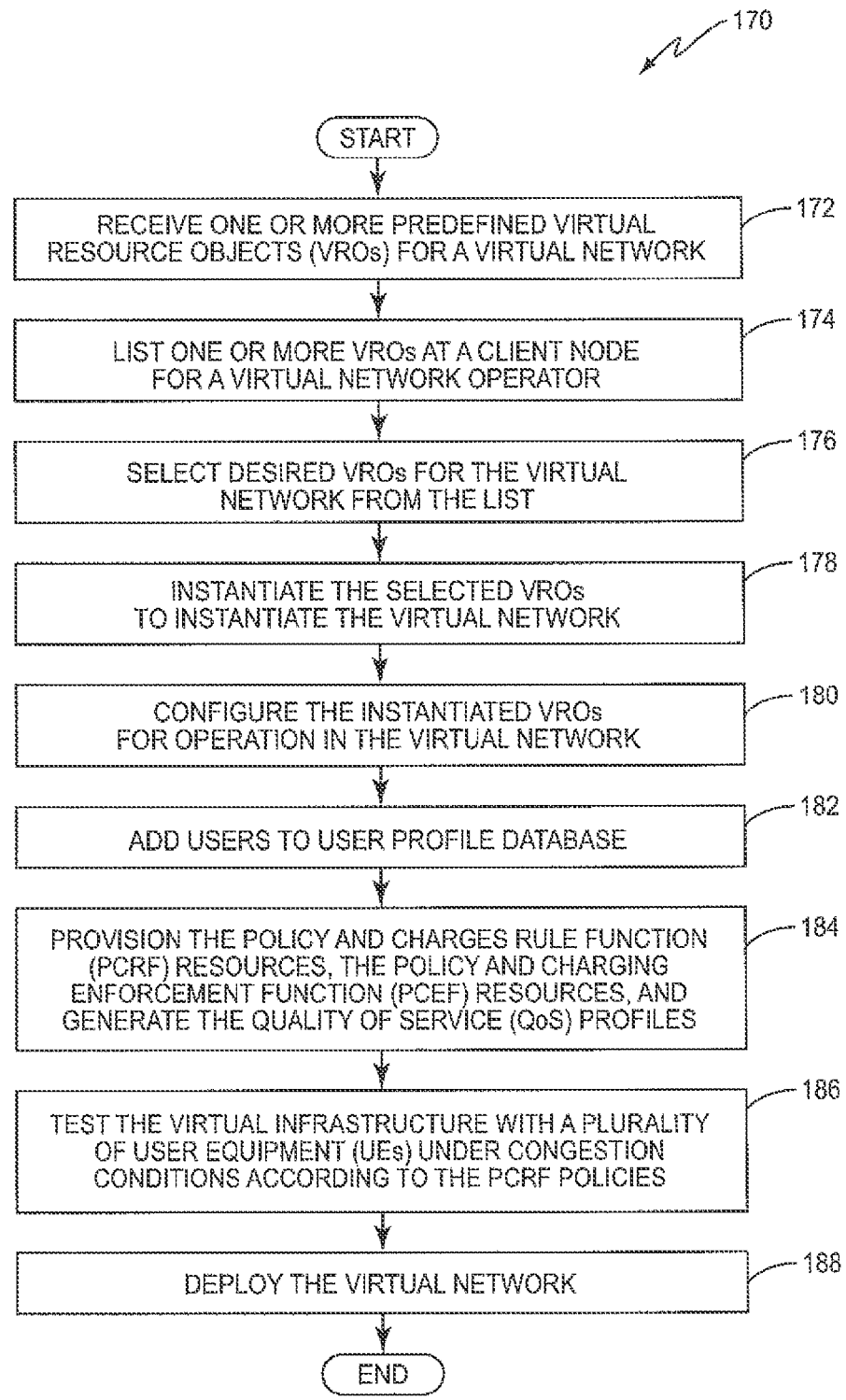
FIG. 5B is a flow diagram illustrating a method of creating a virtual network according to another embodiment of the present invention.

FIG. 5B is a flow diagram illustrating a method 170 of creating a virtual network using the VROs. Method 170 begins with the VNO client device 58 receiving one or more predefined VROs for use in building a virtual network (box 172). The predefined VROs may comprise, for example, a default set of rules, policies, and other resources imposed on the VNOs. The client node 58 lists one more VROs on a display for the VNO (box 174), who then selects desired VROs from the list to use in creating the virtual network (box 176). The VNO can then instantiate the selected VROs to instantiate the virtual network (box 178), and configure the instantiated VROs for operation in the virtual network (box 180). Using the client node 58, the VNO can then add users to a user profile database (box 182) and provision the PCRF, the PCEF, and generate the QoS profiles (box 184). Using the instantiated VROs, the VNO can then instantiate a "Test Virtual Network" to test the virtual network under certain congestion conditions according to the policies provisioned in the PCRF (box 186). If the test runs are satisfactory, the VNO can deploy the virtual network (box 188).

Figure 6:
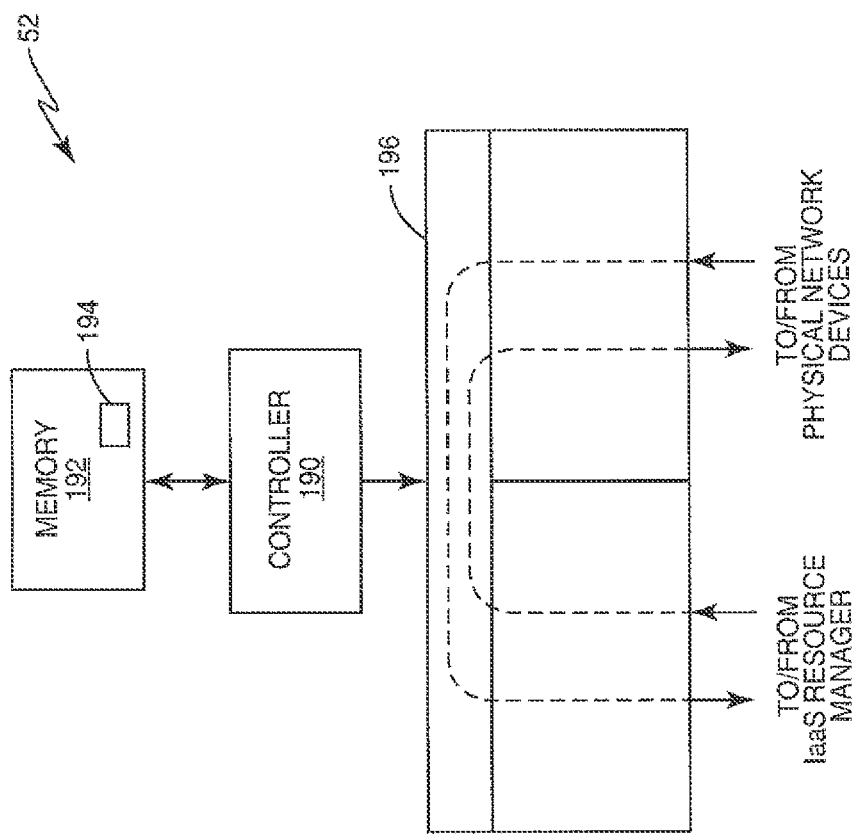
FIG. 6 is a block diagram illustrating a network resource module configured to interface the network nodes with the Infrastructure-as-a-Service (IaaS) management middleware according to one embodiment of the present invention.

FIG. 6 is a block diagram illustrating some of the components of network resource module 52 according to one embodiment of the present invention. As previously described, the network resource module 52 functions as an adaptor to nodes in the network that may not be able to communicate messages using XMI. As seen in FIG. 6, the network resource module 52 comprises a programmable controller 190, a memory 192, and a communication interface 196 that communicates messages between the network resource module 52, and the resource manager 50 and network nodes 60.

The programmable controller 190 may comprise one or more microprocessors, microcontrollers, hardware circuits, and/or a combination thereof, configured to execute the instructions and logic 194 used to detect or sense the network nodes 60, as well as to communicate with the resource manager 50 and the controllers associated with the network nodes 60. The programmable controller 190 is also configured to translate the network node resource information that is in a node-configured implementation to the XML-based description seen in FIG. 8, as previously described. Further, the programmable controller 190 can determine the type of network node providing the resource information, and adapt the abstraction of the network resource information based on the determined network node type. More particularly, the programmable controller 190 is configured to generate the VROs based on the type of network node that provides the information to be abstracted for the VROs.

Memory 192 stores data and programs needed by the programmable controller 190, including the instructions and logic 194 that define the functions of the network resource module 52, and also buffers incoming and outgoing messages (e.g., XMI messages). Memory 192 may comprise, for example, one or more discrete computer readable media, such as random access memory, read-only memory, and flash memory.

Communications interface 196 communicatively interfaces the network resource module 52 to the network nodes 60 of the LTE-SAE network 10, as well as the resource manager 50 or other IaaS middleware manager. The communication interface 196 may comprise, for example, an Ethernet interface, cable modem, or DSL interface. The network resource module 52 monitors the LTE-SAE network 10 via the communication interface 196 to determine whether a new network node or device has been added or removed, or whether a configuration for an existing node has changed. The network resource module 52 sends messages describing the resources provided by the network nodes 60 to the resource manager 50 via the communication interface 196.

In one embodiment, the communication interface 196 comprises a RESTful interface that facilitates the exchange of XML-based messages (e.g., GET, PUT, POST, and DELETE) using XMI with the resource manager 50.

Figure 7:
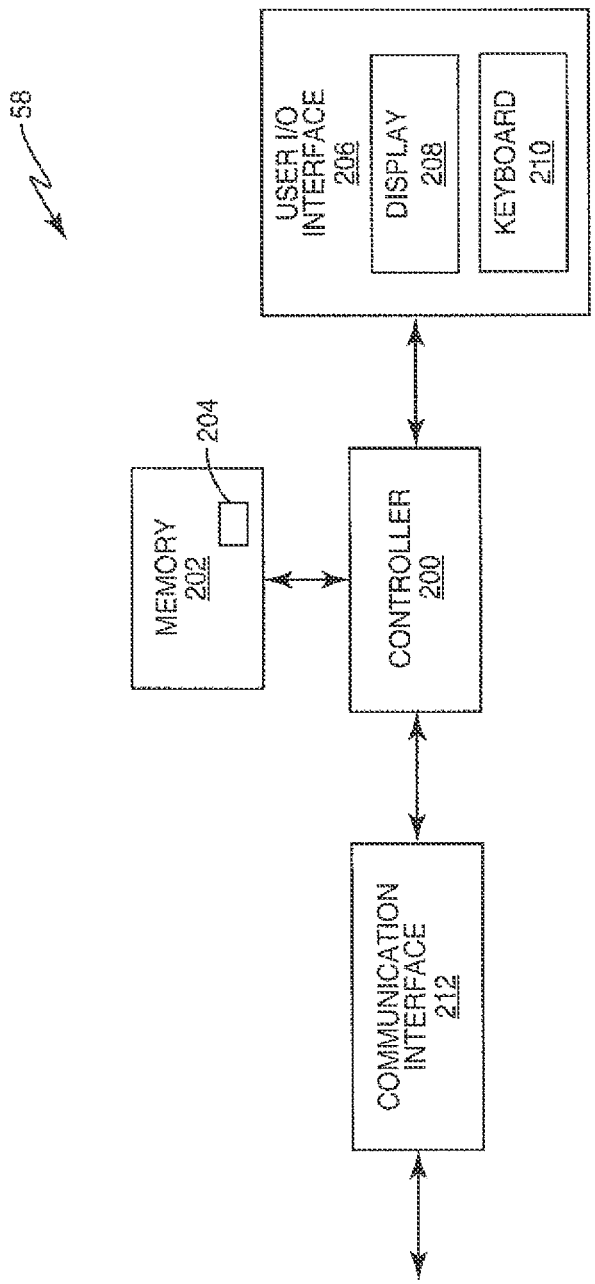
FIG. 7 is a block diagram illustrating some of the components of a client node configured for creating a virtual network according to one embodiment of the present invention.

FIG. 7 is a block diagram illustrating some of the components of a client node 58. The client node 58 comprises a programmable controller 200, a memory 202, logic and instructions 204 that are executed by controller 200, a user I/O interface 206 having a display 208 and a keyboard 210, and a communication interface 212. Like controller 190, controller 200 may also comprise one or more microprocessors, microcontrollers, hardware circuits, and/or a combination thereof, configured to execute the instructions and logic 204 used to build and maintain a virtual network as previously described. Memory 202 stores the data and programs needed by the programmable controller 200, including the instructions and logic 204 that define the functions of the client node 58. Memory 202 may comprise, for example, one or more discrete computer readable media, such as random access memory, read-only memory, and flash memory. The user I/O interface allows the VNO to select desired VROs for the virtual network, and to define certain constraints for the virtual network. The client node 58 communicates with the resource manager 50, as well as with the resource discovery service 62, via the communication interface 212.

As previously stated, FIG. 8 illustrates a list of available VROs sent by the resource manager 50 to the registry 56. The list of available VROs provides a plurality of generic class definitions for all VROs that are then used to create specific VROs. For example, an exemplary VRO for an eNodeB resource may be coded from the class definitions as follows.

```
<eNodeB>
    <capacity>10000 subs</capacity>
    <pwr-out>100 watts</pwr-out>
    <air-if>lte</air-if>
    <range>1000 meters</range>
    <description>3gpp radio access node</description>
</eNodeB>
```

As seen in this XML code example, the VRO describes the attributes of an eNodeB resource. Such attributes include, but are not limited to, the capacity of the eNodeB to handle up to a specified number of subscribers, the type of air interface used by the eNodeB, its range, and a description of the VRO. Fractional values of these attributes may be specified by the VNO building the virtual network according to his or her specific needs; however, there are constraints stipulated by the infrastructure provider. These constraints may stipulate, for example, maximum values for one or more of the attributes since each VRO resource is shared among many VNOs. It should be realized that VROs for other infrastructure resources, such as gateways, for example, may also be created from the generic VRO class definitions in the list of available VROs.

Therefore, the present invention provides a system and method for extending the services offered by conventional IaaS solutions to the LTE-EPC infrastructure by abstracting the resources provided by one or more network nodes or other elements of an LTE-EPC network into VROs published for the VNOs to use in building and maintaining a virtual network. However, those of ordinary skill in the art will also readily appreciate the numerous advantages provided by the present invention. For example, with the present invention, the virtual LTC-EPC is extended to existing data centers. The present invention also provides compatibility between the PCC nodes in the network and the Cloud Offerings using IaaS middleware where previously, there was none.

In addition, system administrators and VNOs will also have more granular control over the network resources for the creation and enforcement of policies and Quality of Service (QoS) management. Further, the present invention enables new resources to be published and instantiated by the VNOs within hours or days, rather than in weeks or months, as is the case with conventional systems. Additionally, the present invention also facilitates the creation of new business models. By way of example only, the present invention can also be used by Infrastructure providers, Virtual Network Providers, and Network Service Providers. Moreover, the present invention isolates the VNOs from each other better than in conventional systems, as well as the production virtual network from the test virtual network, and allows the VNOs to offer their systems as "pay-as-you-go" LTE-EPC systems in the Cloud. In addition, with the present invention, the VNO is able to add a variety of different "X-as-a-Service" services and functions to its virtual network.

The present invention may, of course, be carried out in other ways than those specifically set forth herein without departing from essential characteristics of the invention.

Therefore, the present embodiments are to be considered in all respects as illustrative and not restrictive, and all changes coming within the meaning and equivalency range of the appended claims are intended to be embraced therein.

What is claimed is:

1. A node for creating a virtual infrastructure for a virtual network, the node comprising:
    an interface configured to receive a list identifying one or more Virtual Resource Objects (VROs) representing resources for a virtual network, each VRO comprising corresponding generic class definitions describing resources that are associated with a network node, and that are based on a determined network node type; and
    a controller configured to:
        select desired VROs from the list for the virtual network;
        instantiate the selected VROs to instantiate the virtual network; and
        configure the instantiated VROs for operation in the virtual network, the VROs including one or more Home Subscriber Server (HSS) resources, Service-Aware Support Node (SASN) resources, Packet Data Network-Gateway (PDN-GW) resources, Policy and Charges Rule Function (PCRF) resources, and Policy and Charging Enforcement Function (PCEF) resources.

2. The node of claim 1 wherein the controller is further configured to receive one or more predefined VROs for the virtual network.

3. The node of claim 1 wherein the HSS, SASN, and the PDN-GW comprise a User Profile Database, and wherein the controller is further configured to add one or more users of corresponding User Equipment (UE) to the User Profile Database.

4. The node of claim 1 wherein the controller is further programmed to:
    provision the PCRF with one or more static and/or dynamic policies;
    identify services that will be available to users via the virtual network; and
    generate one or more Quality of Service (QoS) profiles for the PCEF.

5. The node of claim 4 wherein the controller is further programmed to instantiate a Test Virtual Network (TVN) to test the virtual network with a plurality of test UEs under congestion conditions according to policies provided to the PCRF.

6. A method for creating a virtual infrastructure for a virtual network, the method comprising:
    listing one or more Virtual Resource Objects (VROs) representing resources for a virtual network, each VRO comprising corresponding generic class definitions describing resources that are associated with a network node, and that are based on a determined network node type;
    selecting desired VROs for the virtual network from the list;
    instantiating the selected VROs to instantiate the virtual network; and
    configuring the instantiated VROs for operation in the virtual network, the VROs including one or more Home Subscriber Server (HSS) resources, Service-Aware Support Node (SASN) resources, Packet Data Network-Gateway (PDN-GW) resources, Policy and Charges Rule Function (PCRF) resources, and Policy and Charging Enforcement Function (PCEF) resources.

7. The method of claim 6 further comprising receiving one or more predefined VROs for the virtual network.

8. The method of claim 7 wherein the HSS, SASN, and the PDN-GW comprise a User Profile Database, and wherein the method further comprises adding one or more users of corresponding User Equipment (UE) to the User Profile Database.

9. The method of claim 7 further comprising:
provisioning the PCRF with static and/or dynamic policies;
provisioning the PCEF to identify services that will be available to users via the virtual network; and
generating one or more Quality of Service (QoS) profiles, and provisioning the PCEF with the QoS profiles.

10. The node of claim 9 further comprising instantiating a Test Virtual Network (TVN) to test the virtual infrastructure with a plurality of test UEs under congestion conditions according to policies provided to the PCRF.

* * * * *

UNITED STATES PATENT AND TRADEMARK OFFICE
CERTIFICATE OF CORRECTION

PATENT NO.         : 8,855,017 B2
APPLICATION NO.    : 13/163246
DATED              : October 7, 2014
INVENTOR(S)        : Lemieux It is certified that error appears in the above-identified patent and that said Letters Patent is hereby corrected as shown below:

On the Title Page, in item (57), under "ABSTRACT", in Column 2, Line 10, delete "(VROs)" and insert -- (VNOs) --, therefor.

In the Specification

In Column 2, Line 47, delete "LTC-EPC" and insert -- LTE-EPC --, therefor.

In Column 11, Line 43, delete "LTC-EPC" and insert -- LTE-EPC --, therefor.

In the Claims

In Column 13, Line 12, in Claim 10, delete "node" and insert -- method --, therefor.

Signed and Sealed this
Fifth Day of May, 2015

Michelle K. Lee
*Director of the United States Patent and Trademark Office*